(12) United States Patent
Thomas

(10) Patent No.: US 11,828,403 B2
(45) Date of Patent: Nov. 28, 2023

(54) COATED CLOSED-CELL FOAM TUBE INSULATIONS AND METHODS FOR PRODUCING THE SAME

(71) Applicant: L'Isolante K-Flex S.p.A., Roncello (IT)

(72) Inventor: Biju Valakkadavil Thomas, Cary, NC (US)

(73) Assignee: L'Isolante K-Flex S.p.A., Roncello (IT)

(*) Notice: Subject to any disclaimer, the term of this patent is extended or adjusted under 35 U.S.C. 154(b) by 0 days.

(21) Appl. No.: 16/860,880

(22) Filed: Apr. 28, 2020

(65) Prior Publication Data
US 2020/0256505 A1 Aug. 13, 2020

Related U.S. Application Data

(62) Division of application No. 16/014,333, filed on Jun. 21, 2018.
(Continued)

(51) Int. Cl.
*F16L 59/14* (2006.01)
*F24F 13/02* (2006.01)
(Continued)

(52) U.S. Cl.
CPC ............ *F16L 59/14* (2013.01); *C09D 123/16* (2013.01); *F16L 59/029* (2013.01); *F16L 59/10* (2013.01);
(Continued)

(58) Field of Classification Search
CPC ............. F16L 59/02; F16L 59/021–022; F16L 59/14–153
See application file for complete search history.

(56) References Cited

U.S. PATENT DOCUMENTS 4,162,093 A 7/1979 Sigmund
4,271,218 A * 6/1981 Heckel .................. F16L 59/021
138/141
(Continued)

FOREIGN PATENT DOCUMENTS

CA 3067846 7/2023
CN 103146080 A 6/2013
(Continued)

OTHER PUBLICATIONS

Armacel, Fundamentals ArmaFlex® Elastomeric Foams—Applying Adhesive, Jan. 27, 2011 (accessed Jul. 8, 2020), Armacell, https://www.youtube.com/watch?v=_x_QcF4o_a4, pertinent portion 0:12-0:58 (Year: 2011).*
(Continued)

*Primary Examiner* — Matthew J Daniels
*Assistant Examiner* — Andrew L Swanson
(74) *Attorney, Agent, or Firm* — Jenkins, Taylor & Hunt, P.A.

(57) ABSTRACT

Provided is an insulation product, optionally in a tubular form, that includes a coated foam insulation layer, where the foam insulation layer has a closed-cell structure. The coating can comprise a thermoplastic elastomer that seamlessly covers and is bonded to an outer surface of the elastomeric foam layer in the absence of an adhesive bonding material to protect the foam insulation layer, e.g., during outdoor insulation applications. A pipe where the insulation product is installed is also provided, as is a method of installing the insulation product, and a method of producing the insulation product.

7 Claims, 6 Drawing Sheets

Related U.S. Application Data

(60) Provisional application No. 62/527,724, filed on Jun. 30, 2017, provisional application No. 62/523,563, filed on Jun. 22, 2017.

(51) Int. Cl.

| | |
|---|---|
| *C09D 123/16* | (2006.01) |
| *F16L 59/02* | (2006.01) |
| *F16L 59/10* | (2006.01) |
| *B32B 27/28* | (2006.01) |
| *C09D 127/06* | (2006.01) |
| *C09D 133/20* | (2006.01) |
| *B32B 37/15* | (2006.01) |

(52) U.S. Cl.
CPC ...... *F24F 13/0245* (2013.01); *F24F 13/0263* (2013.01); *B32B 27/285* (2013.01); *B32B 37/15* (2013.01); *B32B 2255/102* (2013.01); *B32B 2255/26* (2013.01); *B32B 2266/0292* (2013.01); *B32B 2266/08* (2013.01); *B32B 2305/022* (2013.01); *B32B 2307/304* (2013.01); *B32B 2307/3065* (2013.01); *B32B 2307/71* (2013.01); *B32B 2319/00* (2013.01); *B32B 2323/04* (2013.01); *B32B 2323/16* (2013.01); *B32B 2597/00* (2013.01); *C09D 127/06* (2013.01); *C09D 133/20* (2013.01)

(56) References Cited

U.S. PATENT DOCUMENTS

| | | | |
|---|---|---|---|
| 5,413,828 A * | 5/1995 | De Keyser | B32B 27/18 |
| | | | 428/36.5 |
| 5,971,034 A | 10/1999 | Heisey et al. | |
| 6,071,582 A | 6/2000 | Tangiku et al. | |
| 6,228,476 B1 | 5/2001 | Bogrett et al. | |
| 6,776,948 B1 | 8/2004 | Arvidson et al. | |
| 6,902,784 B2 | 6/2005 | Princell et al. | |
| 7,074,466 B2 | 7/2006 | DeBraal et al. | |
| 7,413,785 B2 * | 8/2008 | Mehan | B29C 48/9105 |
| | | | 428/36.91 |
| 7,914,252 B2 | 3/2011 | Hopkins | |
| 8,163,811 B2 | 4/2012 | Quante et al. | |
| 8,186,388 B2 | 5/2012 | Princell et al. | |
| 8,398,365 B2 | 3/2013 | Hopkins | |
| 8,774,966 B2 | 7/2014 | Ziegler et al. | |
| 9,062,165 B2 | 6/2015 | Meller et al. | |
| 9,091,377 B2 | 7/2015 | Lechuga | |
| 9,855,174 B1 | 1/2018 | Whelan et al. | |
| 11,028,959 B2 | 6/2021 | Thomas | |
| 2002/0009583 A1 | 1/2002 | Hartman | |
| 2002/0182347 A1 | 12/2002 | DeBraal et al. | |
| 2003/0035911 A1 | 2/2003 | Krist et al. | |
| 2004/0161562 A1 * | 8/2004 | Graeter | B32B 1/08 |
| | | | 428/36.1 |
| 2004/0208997 A1 | 10/2004 | Arvidson et al. | |
| 2005/0031811 A1 | 2/2005 | Mehan et al. | |
| 2008/0106014 A1 | 5/2008 | Gigl | |
| 2009/0293980 A1 * | 12/2009 | Burke, II | F16L 9/06 |
| | | | 138/146 |
| 2010/0154917 A1 | 6/2010 | Batallas et al. | |
| 2010/0165407 A1 | 7/2010 | Witkowski et al. | |
| 2010/0173109 A1 * | 7/2010 | Okabe | F16L 5/04 |
| | | | 428/36.91 |
| 2010/0210745 A1 * | 8/2010 | McDaniel | C09D 5/1668 |
| | | | 521/55 |
| 2011/0165407 A1 | 7/2011 | Weidinger et al. | |
| 2014/0305534 A1 * | 10/2014 | Peil | F16L 59/029 |
| | | | 138/151 |
| 2016/0187045 A1 | 6/2016 | McGarry | |
| 2016/0339311 A1 | 11/2016 | Goji et al. | |
| 2018/0372260 A1 | 12/2018 | Thomas | |
| 2021/0254779 A1 | 8/2021 | Thomas | |

FOREIGN PATENT DOCUMENTS

| | | |
|---|---|---|
| EP | 0553522 A1 | 8/1993 |
| EP | 0615596 B1 | 8/1996 |
| EP | 1295712 A1 | 3/2003 |
| IN | 402308 | 7/2022 |
| RU | 2014153001 A | 8/2016 |
| WO | WO 93/12370 A2 | 6/1993 |
| WO | WO 98/56240 | 12/1998 |
| WO | WO 2010/009559 A1 | 1/2010 |
| WO | WO 2018/237120 A1 | 12/2018 |

OTHER PUBLICATIONS

Eco Three, Spray Foam Insulation FAQs, https://eco-three.com/spray-foam-insulation-faqs/, Jun. 28, 2016 (Accessed Feb. 3, 2021) (Year: 2016).*
Advisory Action corresponding to U.S. Appl. No. 16/014,333 dated Oct. 17, 2019.
AIREX EFLEXGUARD™ HVAC Line Set Insulation Protectors Brochure, AIREX Manufacturing Inc., p. 1 (2015).
International Search Report and Written Opinion corresponding to International Patent Application Serial No. PCT/US2018/038719 dated Sep. 19, 2018.
International Preliminary Report on Patentability corresponding to International application No. PCT/US2018/038719 dated Dec. 24, 2019.
Notice of Publication corresponding to International Patent Application No. PCT/US2018/038719 dated Dec. 27, 2018.
Notice of Publication corresponding to European patent application 18820992.8 dated Mar. 25, 2020.
Office Action (Restriction Requirement) corresponding to U.S. Appl. No. 16/014,333 dated Aug. 30, 2018.
Office Action corresponding to U.S. Appl. No. 16/014,333 dated Jan. 10, 2019.
Office Action corresponding to U.S. Appl. No. 16/014,333 dated Jun. 6, 2019.
Office Action corresponding to U.S. Appl. No. 16/014,333 dated Nov. 21, 2019.
Advisory Action corresponding to U.S. Appl. No. 16/014,333 dated Oct. 21, 2020.
Office Action corresponding to U.S. Appl. No. 17/246,416 dated Sep. 23, 2021.
Office Action corresponding to Indian Application No. 202027001292 dated Aug. 6, 2021.
Notice of Publication of Application Corresponding to U.S. Appl. No. 17/246,416 dated Aug. 19, 2021.
Extended European Search Report corresponding to European Patent Application No. 18820992.8-1107 dated Feb. 23, 2021.
Notice of Allowance corresponding to U.S. Appl. No. 16/014,333 dated Feb. 10, 2021.
Notice of Allowability corresponding to U.S. Appl. No. 16/014,333 dated Mar. 3, 2021.
Notice of Allowability corresponding to U.S. Appl. No. 16/014,333 dated Mar. 17, 2021.
Office Action (Restriction Requirement) corresponding to U.S. Appl. No. 17/246,416 dated Jul. 13, 2021.
Office Action Corresponding to Canadian Application No. 3,067,846 dated Aug. 20, 2021.
Office Action corresponding to Russian Patent Application No. 2020100607 dated Oct. 27, 2021.
Office Action corresponding to U.S. Appl. No. 17/246,416 dated Jan. 26, 2022.
Office Action (Hearing Notice) corresponding to Indian Application No. 202027001292 dated Jan. 24, 2022.
Office Action corresponding to Canadian Application No. 3,067,846 dated Mar. 11, 2022.
Office Action and Search Report corresponding to Chinese Application No. 201880054444.X dated Jan. 28, 2022.
Office Action corresponding to Chinese Application No. 201880054444X dated Sep. 21, 2022.
Office Action (Hearing Notice) corresponding to Indian Application No. 202027001292 dated May 27, 2022.

(56) References Cited

OTHER PUBLICATIONS

Armacell Enterprise GmbH. Armaflex® Kühlpair: Pre-insulated pipes for rapid and reliable installation of air-conditioning systems, pp. 1-5, Nov. 7, 2013.
Office Action corresponding to Australian Patent Application No. 2018289545 dated Aug. 25, 2022.
Office Action corresponding to Mexican Patent Application No. 2020000022 dated Oct. 27, 2022 [English Abstract].
Office Action corresponding to U.S. Appl. No. 16/014,333 dated Jul. 8, 2020.
Deicision of Rejection corresponding to Chinese Application No. 20188005444X dated Feb. 11, 2023.
Notice of Allowance corresponding to Canadian Application No. 3,067,846 dated Jan. 10, 2023.
Office Action corresponding to Australian Patent Application No. 2018289545 dated Jan. 10, 2023.
Communication pursuant to Rule 114(2) EPC corresponding to European Patent Application No. 18820992.8-1107/3638719 dated Mar. 10, 2022.
Notice of Allowability corresponding to U.S. Appl. No. 17/246,416 dated Apr. 18, 2023.
Notice of Allowance and Interview Summary corresponding to U.S. Appl. No. 17/246,416 dated Apr. 12, 2023.
Office Action corresponding to European Patent Application Serial No. 18820992.8-1107 dated May 3, 2023.
Risk Management Technologies, Armacell Safety Data Sheet: Armaflex FRV, pp. 1-6, Apr. 10, 2015, AU.
Risk Management Technologies, Armacell Safety Data Sheet: Armaflex Kuhlpair Copper, pp. 1-6, Apr. 10, 2015, AU.
Armstrong World Industries GmbH, Armstrong Monageanleitung, 1995 (10 pages).
"hose" definition according to Cambridge Dictionary; 5 pages, accessed on Jun. 5, 2023 at: https://dictionary.cambridge.org/dictionary/essential-american-english/hose.
Armacell Australia Pty Ltd, Armaflex® FRV: Fire retardant paircoil for safety & compliance in commercial and multi-storey apartment buildings, pp. 1-4, Aug. 31, 2016.
Armacell Australia Pty Ltd, Armaflex® FRV: Enhanced performance and indoor air quality, pp. 1-12, Nov. 2021. Retrieved from https://local.armacell.com/en/armacell-australia/products/technical-insulation/armaflex-frv/ on Feb. 3, 2022, via www.armacell.com.au.
Armaflex®FRV, Armaflex® FRV: Closed-Cell Foam Insulation—Armacell Australia, https://local.armacell.com/en/armacell-australia/products/technical-insulation/armaflex-frv/, pp. 1-6, retrieved Feb. 3, 2022, via www.armacell.com.au.
Notice of Allowance corresponding to Mexican Patent Application No. MX/a/2020/000022 dated Apr. 11, 2023.
Notice of Acceptance corresponding to Australian Patent Application 2018289545 dated Mar. 23, 2023.
Third Party Pre-Issuance Submission Pursuant to 35 U.S.C. 122(d) and 37 C.F.R. 1.290 corresponding to U.S. Appl. No. 17/246,416 dated Feb. 3, 2022.
Notice of Allowance corresponding to U.S. Appl. No. 17/246,416 dated Aug. 11, 2023.
Notice of Grant corresponding to Australian Patent Application 2018289545 dated Jul. 20, 2023.
Office Action corresponding to Vietnamese Patent Application No. 1-2020-00462 dated Jul. 11, 2023.

* cited by examiner

COATED CLOSED-CELL FOAM TUBE INSULATIONS AND METHODS FOR PRODUCING THE SAME

CROSS-REFERENCE TO RELATED APPLICATIONS

This application is a divisional of U.S. patent application Ser. No. 16/014,333, filed Jun. 21, 2018, which claims priority U.S. Provisional Application Ser. No. 62/523,563, filed Jun. 22, 2017, and U.S. Provisional Application Ser. No. 62/527,724, filed Jun. 30, 2017, the disclosures of each of which are herein incorporated by reference in their entireties.

TECHNICAL FIELD

The presently disclosed subject matter relates generally to closed-cell foam tubes (e.g., closed-cell elastomeric foam tubes) for pipe insulations used over conduits supplying fluids/gases, such as round pipes.

BACKGROUND

Pipes are commonly used in residential or commercial applications for heating, air conditioning, or refrigeration purposes. The pipes are used to convey fluids or gases/air to accomplish their purpose. The temperature of the fluid/gas can cycle from hot to cold. The pipes are generally covered on the exterior with a thermal insulation material to prevent heat gain or loss and to maintain the fluid or gas at a desired temperature. When the pipe is exposed to the elements (outdoors), the thermal insulation is typically covered with a jacket or coating to protect it from abuse and the elements of nature.

For air conditioning applications, thermal insulation properties are desirable, as is resistance to moisture penetration, which is a common issue on low temperature applications where condensation can occur. Many residential and commercial facility air conditioning and refrigeration applications include a portion, or all, of the conduit pipe exposed to outdoor elements. The exterior surface of the thermal insulation used to cover such pipes is subject to degradation by UV, moisture, abuse or the like and, as such, is advised by the insulation manufacturer or required per the local mechanical, energy, or building code to be covered by a protective facing.

Closed-cell elastomeric insulation products have a structure of individual closed cells that are non-connecting. This structure gives the product a low thermal conductivity and high moisture penetration resistance, making it a good insulation for below ambient applications where condensation is an issue.

However, in applications that cycle from cold to hot, such as air conditioning line sets, this closed-cell structure can create a problem. The closed-cell structure of the product can cause the cells/material to expand or contract (up to 4% depending on the temperature differential) when exposed to hot or cold either internally from the pipe surface or externally from the environment (ambient temperature) heating and cooling. This expansion and contraction creates a problem with any stiff jacket or coating applied to the insulation layer. The expansion forces can cause the jacket to split or separate and the coating to crack. Field-installed jacketing solutions exist for 2-step installations, but rely on installer accuracy for proper performance over time and lend themselves to not being used in cost competitive markets, which negatively impacts the facility owner. They also all have seams which allows for moisture intrusion.

In view of the foregoing, there exists a need for a closed-cell foam insulation product (e.g., tubing) for covering conduits (e.g., round pipes) that cycle from hot to cold and that is also suitably covered with a facing for protection from the elements. In particular, there is a need for a closed-cell insulation product that has a seamless, approximately 100% surface area coverage of a protective coating layer that can protect the closed-cell foam from moisture, ultraviolet (UV), and mechanical abuse, but that is flexible to match the flexibility of the foam and that conforms to the shape of the foam and can be applied to the bends in the piping application. There is also a need for an insulation product that is non-toxic to the environment, is not substantially affected by heat or environmental conditions, and/or that is easy to install.

SUMMARY

The presently disclosed subject matter provides in some embodiments an insulation product comprising a composite comprising: (a) a foam insulation layer having a closed-cell structure, optionally wherein the foam insulation layer is an elastomeric or polyethylene foam insulation layer having a closed-cell structure; and (b) a coating layer bonded to an outer surface of the foam insulation layer, optionally wherein said insulation product is free of an adhesive to bond the coating layer to the outer surface of the elastomer layer.

In some embodiments, the foam insulation layer comprises a material selected from the group comprising ethylene propylene diene monomer (M-class) (EPDM), acrylonitrile-butadiene rubber (NBR), polyvinyl chloride (PVC), polystyrene, polyisocyanurate, or combinations thereof. In some embodiments, the foam insulation layer has a density of between about 3 and about 6 pounds per cubic foot ($lb/ft^3$).

In some embodiments, the coating layer comprises a thermoplastic elastomer (TPE), a thermoplastic vulcanizate (TPV), and/or a thermoplastic polyurethane (TPU), optionally wherein the TPE is based on EPDM polymer, further optionally wherein the EPDM is a UV-resistant EPDM. In some embodiments, the coating layer further comprises a flame retardant and/or one or more additional additives.

In some embodiments, the composite has a thickness of between about 0.5 inches and about 1 inch and/or wherein the composite is provided in a tubular form.

In some embodiments, the presently disclosed subject matter provides a composite tubing for use as an insulation product, wherein said composite tubing comprises: (a) a foam insulation layer having a closed-cell structure, optionally wherein the foam insulation layer is an elastomeric or polyethylene foam insulation layer having a closed-cell structure; and (b) a coating layer bonded to and seamlessly covering an outer surface of the foam insulation layer, optionally wherein the coating layer is bonded to the outer surface of the foam insulation layer in the absence of an adhesive. In some embodiments, the foam insulation layer comprises a material selected from the group comprising ethylene propylene diene monomer (M-class) (EPDM), acrylonitrile-butadiene rubber (NBR), polyvinyl chloride (PVC), polyethylene, polystyrene, polyisocyanurate, or combinations thereof. In some embodiments, the foam insulation layer has a density of between about 3 and about 6 pounds per cubic foot ($lb/ft^3$).

In some embodiments, the coating layer comprises a thermoplastic elastomer (TPE), optionally wherein the TPE is EPDM, further optionally wherein the EPDM is a UV-resistant EPDM. In some embodiments, the coating layer further comprises a flame retardant and/or one or more additional additives.

In some embodiments, the tubing has a wall thickness of between about 0.5 inches and about 1 inch. In some embodiments, the tubing is a straight tubing having a length of between about three feet and about six feet or a continuous coil tubing having a length of up to about 1,000 feet and/or wherein the tubing has an inner diameter (ID) ranging from about 0.25 inches to about 6 inches, optionally wherein the ID is between about 0.5 inches and about 2.875 inches.

In some embodiments, the presently disclosed subject matter provides a round pipe installation, comprising: (a) a round pipe; and (b) a composite tubing encompassing an outer surface of the pipe, wherein said composite tubing comprises: (i) a foam insulation layer having a closed-cell structure, optionally wherein the foam insulation layer is an elastomeric or polyethylene foam insulation layer having a closed-cell structure, and (ii) a coating layer bonded to an outer surface of the foam insulation layer, optionally wherein said insulation product is free of an adhesive to bond the coating layer to the outer surface of the foam insulation layer. In some embodiments, the foam insulation layer comprises a material selected from the group comprising PVC, NBR, EPDM, polyethylene, polystyrene, polyisocyanurate or combinations thereof. In some embodiments, the coating layer comprises a thermoplastic elastomer, optionally wherein the coating layer comprises EPDM, further optionally wherein the coating layer comprises UV-resistant EPDM. In some embodiments, the coating layer further comprises a flame retardant and/or one or more additional additives.

In some embodiments, the composite tubing has a thickness of between about 0.5 inches and about 1 inch. In some embodiments, the pipe is a round-shaped metal pipe, further optionally wherein the metal pipe has an outer diameter of about 4.125 inches or less. In some embodiments, the installation is at an outdoor location and/or where there is heat exposure, optionally wherein the installation is part of a heat pump or a solar hot water heating unit.

In some embodiments, the presently disclosed subject matter provides a method of installing an insulation product on a pipe, the method comprising: (a) providing a composite tubing comprising a foam insulation layer having a closed-cell structure, optionally wherein the foam insulation layer is an elastomeric or polyethylene foam insulation layer having a closed-cell structure, and a coating layer bonded to an outer surface of the foam insulation layer; and (b) sliding the tubing over a length of the pipe, optionally wherein the sliding comprises pushing the tubing over the length of pipe. In some embodiments, the method further comprises coating the transverse ends of the tubing with a contact adhesive, thereby sealing the ends.

In some embodiments, the presently disclosed subject matter comprises a method for installing an insulation product on a pipe, the method comprising: (a) providing a composite tubing comprising a foam insulation layer having a closed-cell structure, optionally wherein the foam insulation layer is an elastomeric or polyethylene foam insulation layer having a closed-cell structure, and a coating layer bonded to an outer surface of the foam insulation layer; (b) slitting the tubing longitudinally to provide two slit longitudinal ends traversing the length of the tubing; (c) wrapping the tubing around a section of pipe to encompass the outer diameter of the pipe section and so that the two slit ends are directly adjacent to one another, thereby forming an open seam; (d) coating each of the two slit longitudinal ends of the tubing with an adhesive coating and contacting the coated slit longitudinal ends to each other to form a sealed seam; and (e) coating the two transverse ends of the tubing with an adhesive coating to seal the transverse ends and/or to adhere one or both of the transverse ends to another length of insulation tubing, optionally another length of the composite tubing.

In some embodiments, the presently disclosed subject matter provides a method of making an insulation product, the method comprising: (a) providing a closed-cell foam tube, optionally a closed-cell elastomeric or polyethylene foam tube; and (b) extruding a polymeric coating in an encapsulating manner over the closed-cell foam tube to seamlessly cover the outer surface of the foam tube, wherein the extruding is performed at a temperature to provide a bond between the polymeric coating and the closed-cell foam surface and wherein the polymeric coating comprises a thermoplastic elastomer, optionally wherein the bond is an adhesive-free bond. In some embodiments, the closed-cell foam tube comprises a material selected from the group comprising PVC, NBR, EPDM, polyethylene, polystyrene, polyisocyanurate or combinations thereof. In some embodiments, the polymeric coating comprises a thermoplastic elastomer, optionally wherein the thermoplastic elastomer comprises EPDM or a UV-resistant EPDM.

In some embodiments, the closed-cell foam tube is prepared via extrusion and vulcanization. In some embodiments, the method comprises an in-line process with the manufacturing of the elastomeric tubing.

Accordingly, is an object of the presently disclosed subject matter to provide coated insulation products (e.g., tubing) or pipes where the insulation product is installed, and methods of installing, producing, and using the insulation products.

An object of the presently disclosed subject matter having been stated hereinabove, and which is achieved in whole or in part by the presently disclosed subject matter, other objects will become evident as the description proceeds when taken in connection with the accompanying drawings as best described herein below.

DETAILED DESCRIPTION

Figure 1:
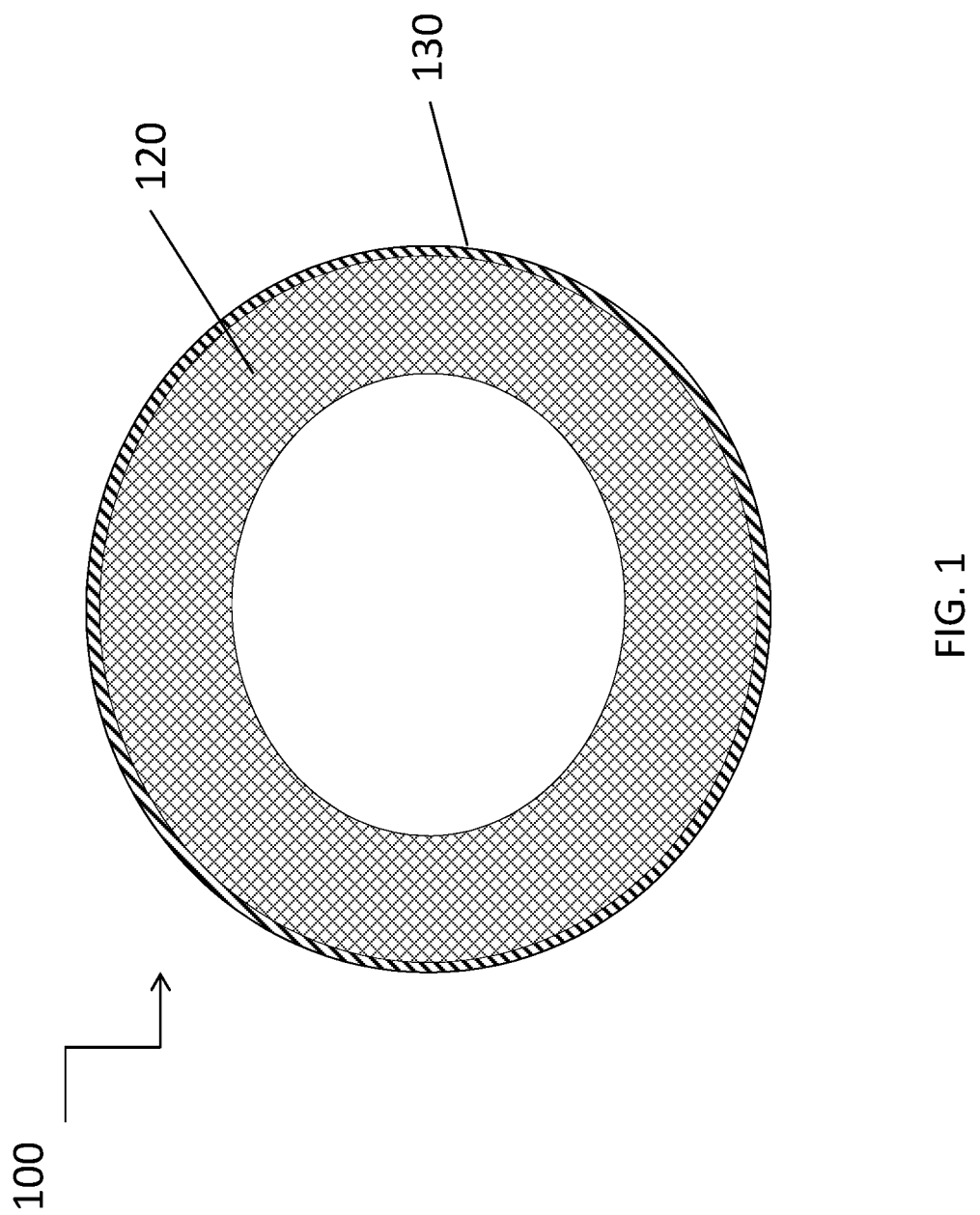
FIG. 1 is a transverse cross-sectional view of a composite insulation tubing in accordance with the presently disclosed subject matter.

The presently disclosed subject matter relates generally to an insulation product or composite product for application to pipes, optionally round pipes, which convey fluids or gases that are exposed to both hot and cold temperatures and that are jacketed, to protect them from the elements and mechanical abuse. The insulation product can optionally be relatively inexpensive, easy to apply, can provide the desired thermal and moisture resistance, and can be used in extreme conditions.

Thus, insulation products, methods of installing the same, and methods of producing the same are provided in accordance with the presently disclosed subject matter. In some embodiments, the product comprises a composite comprising a foam insulation layer (e.g., an elastomeric or polyethylene foam insulation layer) and a coating layer (e.g., a commercially available coating layer) bonded (e.g., via commercially available extrusion equipment) to an outer surface of the foam insulation layer. In some embodiments, the composite insulation product is free of an adhesive to bond the coating layer to the outer surface of the foam insulation layer. In some embodiments, the foam insulation layer has a closed-cell structure (e.g., closed-cell foam). In some embodiments, the coating layer is a thermoplastic elastomer (TPE) or TPE blend. In some embodiments, the composite insulation product is in the form of a tubing.

Many residential and commercial facility air conditioning applications include a portion or all of the conduit pipe exposed to outdoor elements. The exterior surface of the thermal insulation used to cover such pipes is subject to degradation by UV, moisture, abuse or the like and, as such, is advised by the insulation manufacturer or required per the local mechanical, energy or building code to be covered by a protective facing/jacket.

Closed-cell insulation products have a structure of individual closed cells that are non-connecting. This structure gives the product a low thermal conductivity and high moisture penetration resistance, making it an insulation typically chosen for below ambient applications where condensation is an issue. Closed-cell elastomeric foam tubes can offer flexibility for ease of use and installation on applications with many pipe bends, cross-linked cell structure properties for dimensional stability in demanding temperature conditions, and limited combustibility properties to make the tubes compliant to applicable building standards, making closed-cell foams suitable for use over other thermal insulation materials. Closed-cell elastomeric foam insulation products are based on a variety of polymers, with PVC/NBR, NBR and EPDM the most commonly used. However, in applications that cycle from cold to hot, such as air conditioning line sets, this closed-cell structure can create a problem. The closed-cell structure of the product can cause the cells/material to expand or contract (up to 4% depending on the temperature differential) when exposed to hot or cold either internally from the pipe surface or externally from the environment (ambient temperature) heating and cooling. This expansion and contraction creates a problem with any stiff jacket or coating applied to the insulation layer. The expansion forces can cause the jacket to split or separate and the coating to crack. Field-installed jacketing solutions exist for 2-step installations, but rely on installer accuracy for proper performance over time and lend themselves to not being used in cost competitive markets, which negatively impacts the facility owner. They also all have seams which allows for moisture intrusion and many jackets are not flexible or may separate when exposed to heat.

In view of the foregoing, there exists a need for a closed-cell foam insulation tube for covering pipes that cycle from hot to cold and is covered with a seamless, 100% coverage, flexible, single-step installation, code compliant facing for protection from the elements. The insulation should be relatively inexpensive, easy to apply, provide the desired thermal and moisture resistance, and be able to withstand extreme conditions.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are described herein.

While the following terms are believed to be well understood by one of ordinary skill in the art, the following definitions are set forth to facilitate explanation of the presently disclosed subject matter.

Following long-standing patent law convention, the terms "a", "an", and "the" refer to "one or more" when used in this application, including the claims.

Unless otherwise indicated, all numbers expressing quantities, conditions, and so forth used in the specification and claims are to be understood as being modified in all instances by the term "about". Accordingly, unless indicated to the contrary, numerical parameters set forth in this specification and attached claims are approximations that can vary depending upon the desired properties sought to be obtained by the presently disclosed subject matter.

As used herein, the term "about," when referring to a value or to an amount of a mass, weight, temperature, time, volume, concentration, percentage, etc., is meant to encompass variations of in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Numerical ranges recited herein by endpoints include all numbers and fractions subsumed within that range (e.g. 1 to 5 includes, but is not limited to, 1, 1.5, 2, 2.75, 3, 3.90, 4, and 5).

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, a "polymer" refers to a molecule which comprises the multiple repetition of structural units derived from molecules of low relative molecular mass, e.g., polymerizable monomers and/or oligomers.

An "oligomer" refers to a molecule of intermediate relative molecular mass, the structure of which comprises a small plurality (e.g., 2-100, 2-50, 2-20, or 2-10) of units derived from molecules of lower relative molecular mass.

A "copolymer" refers to a polymer derived from more than one species of polymerizable monomer. Copolymers include block copolymers (containing chains of oligomers or polymers where each chain is an oligomeric or polymeric chain based on a different monomeric unit), random copolymers, where monomeric units from different monomers are randomly ordered in the copolymer, and statistical copolymers, where there is a statistical distribution of monomeric units from the different monomers in the copolymer chain.

A "polymer blend" refers to a mixture to two different types of already formed polymer or copolymer.

I. Exemplary Embodiments

The presently disclosed subject matter provides, in one aspect, an insulation product comprising a composite material comprising: (a) a closed-cell foam insulation layer; and (b) a coating layer bonded to an outer surface of the foam insulation layer. In some embodiments, the insulation product is free of an adhesive to bond the coating layer to the outer surface of the foam insulation layer. The foam insulation layer can comprise a fibrous or cellular type material, both of which offer thermal insulation properties.

Cellular insulation, particularly closed-cell insulation, offers resistance to moisture penetration, which is a common issue on low temperature applications where condensation can occur. In some embodiments, the foam layer comprises a closed-cell structure. Closed-cell insulation products can comprise a variety of polymers, including both elastomeric and polyethylene polymers, with polyvinyl chloride (PVC), acrylonitrile-butadiene rubber (NBR), PVC/NBR, ethylene propylene diene monomer (M-class) (EPDM), polyethylene, polystyrene, polyisocyanurate, the most commonly used. Various closed-cell elastomeric insulation materials are known in the art. Exemplary closed cell insulation products include, but are not limited to, the AP Armaflex® family of elastomeric foams and the Imcoa®, Tubolit®, and Tundra® family of polyolefin foams available from Armacell LLC (Chapel Hill, N.C., United States of America), as well as the Aerocel™ family of elastomeric foams available from Aeroflex USA (Sweetwater, Tenn., United States of America). Thus, in some embodiments, the foam insulation layer is an elastomeric or polyethylene foam insulation layer having a closed-cell structure.

In some embodiments of the presently disclosed subject matter, PVC/NBR, NBR and EPDM can be employed in the foam insulation layer. In some embodiments, the foam insulation layer has a density of between about 3 and about 6 pounds per cubic foot ($lb/ft^3$), e.g., about 3.0, 3.2, 3.4, 3.6, 3.8, 4.0, 4.2, 4.4, 4.6, 4.8, 5.0, 5.2, 5.4, 5.6, 5.8, or about 6.0 $lb/ft^3$.

In some embodiments, the coating layer comprises a thermoplastic elastomer (TPE) (e.g., a commercially available TPE). Any suitable TPE or mixture of TPEs can be used that provides the foam insulation layer with protection from abuse/outdoor elements. In some embodiments, the TPE is a thermoplastic vulcanizate (TPV) or a thermoplastic polyurethane (TPU). In some embodiments, the coating layer comprises a commercially available TPE, a commercially available TPV, and/or a commercially available TPU. For example, commercially available TPEs include, but are not limited to, the Hytrel® family of TPEs available from Dupont (Wilmington, Del., United States of America). Commercially available TPUs include, but are not limited to, the Irogran® and Avalon® polymers available from Huntsman (The Woodlands, Tex., United States of America). Commercially available TPVs include the SANTOPRENE™ elastomers available from Exxon Mobil Corporation (Irving, Tex., United States of America).

In some embodiments, the coating layer comprises EPDM. In some embodiments, the coating layer is based on EPDM. In some embodiments, the coating layer comprises a UV-resistant EPDM. In some embodiments, the coating layer further comprises one or more of PVC, NBR, styrene butadiene rubber (SBR) or blends of the aforementioned polymers. In addition to the TPE, the coating layer can comprise one or more flame retardants, and/or one or more additional additives known in the polymer and/or elastomer fields, e.g., a UV-protection agent; a colorant, pigment, or dye; an organic filler; an inorganic filler; a wax; a plasticizer (e.g., a non-phthalate plasticizer); a tackifier; an anti-oxidant; a stabilizer (e.g., a thermal or UV stabilizer); a biocide; an anti-static agent; a processing aid, such as a lubricant or a mold-release agent; and combinations thereof. The type and amount of an additive or additives can be chosen based on the properties desired for the final end use of the insulation product. The additive or additives can be present in an amount that is less than about 50% by volume or by weight of the coating layer composition as a whole. In some embodiments, the coating layer comprises EPDM (e.g., a UV-resistant EPDM), PVC, NBR, SBR, one or more flame retardants, and one or more non-phthalate plasticizer. In some embodiments, the coating layer increases the insulation capacity and strengthens the physical mechanical properties of the composite. The coating layer can be any suitable color. Typically, the coating layer is black. However, in some embodiments, the coating layer is a color other than black, such as, but not limited to white, red, or blue.

In some embodiments, the composite (i.e., the foam insulation layer and the coating layer) or the foam insulation layer has a thickness of between about ¼" and about 2". In some embodiments, the composite or the foam insulation layer has a thickness of between about "and about 1" (e.g., about 0.50, 0.55, 0.60, 0.65, 0.70, 0.75, 0.80, 0.85, 0.90, 0.95, or about 1.00).

In some embodiments, the composite is provided in a tubular form, wherein the coating layer is provided on the surface that makes up the outer diameter of the tube. The tube can be provided in any suitable length, e.g., about 1, 2, 4, 6, 8, 10, or 12 feet ('). The tubing can be a straight tubing or a continuous coil tubing. In some embodiments, the straight tubing can have a length between about 3 and about 6 feet. In some embodiments, the continuous coil tubing can have a length of up to about 1,000 feel (e.g., about 50, 100, 150, 200, 250, 300, 400, 500, 600, 700, 800, 900, or about 1,000 feet). In some embodiments, the tube has an inner diameter of between about 0.25 inches to about 6 inches, or between about 0.375 inches to about 4.25 inches, or between about 0.5" and about 3" (e.g., about ½", ⅝", ¾ ", ⅞", 1", 1⅛", 1⅜", 1½ ", 1⅝", 1⅞', 2", 2⅛", 2⅜", 2½", or about 2⅞").

In some embodiments, the present disclosed subject matter provides a continuously produced closed-cell foam insulation tube (e.g., a closed-cell elastomeric or polyethylene foam insulation tube) for pipe insulations providing thermal and moisture resistance and that is coated seamlessly over approximately 100% (e.g., about 90, 91, 92, 93, 94, 95, 96, 97, 98, 98.5, 99, 99.5, 99.6, 99.7, 99.8, 99.9, or 100%) of its surface area via an adhesive-free extrusion process with a flexible thermoplastic elastomer (TPE) blend to provide protection against outdoor elements. In some embodiments, the closed-cell foam insulation tube is a cross-linked expanded foam material comprising NBR, NBR/PVC or EPDM with a finished product density of approximately 3-6 lb/ft$^3$. The tube can be extruded and vulcanized using common foam extrusion and vulcanization equipment. Then, in some embodiments, in an in-line process, the extruded foam tube is covered with a flexible TPE coating. In some embodiments, the coating is a TPE coating that includes a blend of UV-resistant EPDM resin, flame retardants and polymer additives. In some embodiments, the TPE coating comprises EPDM (e.g., a UV-resistant EPDM), PVC, NBR, SBR, one or more flame retardants, and one or more non-phthalate plasticizer. The coating can be any suitable color, e.g., black, white, red or blue. In some embodiments, the tubing can be obtained by extruding (e.g., using commercially available extrusion equipment) the polymeric coating in a fully-encapsulating manner over the closed-cell foam tube. Suitable extrusion equipment is available, for example, from Davis Standard LLC (Pawcatuck, Conn., United States of America), KraussMaffei Berstorff (Krauss-Maffei Corp., Florence, Ky., United States of America), and TROESTER GmbH & Co., KG (Hannover, Germany). The polymeric coating can be extruded in a fully-encapsulating manner over the closed-cellfoam tube to ensure approximately 100% protective surface area coverage. The extruding can be performed at a temperature that provides an adhesive-free bond of the coating layer to the closed-cell foam surface (e.g., at the melt temperature of the resin for the TPE coating).

The composite coated foam tube according to the presently disclosed subject matter can have superior properties when compared to a standard uncoated elastomeric foam product, or to a coated non-cross-linked foam product not made of elastomeric resins, or to a foam product that is jacketed in the field, and is targeted to be used for pipe/duct insulation. For example, the composite product is flexible (e.g., can conform to bends), has low modulus (providing an ability to push back the product for easy installation of fittings), can withstand demanding internal and external temperature cycles (e.g., temperatures ranging from −70° F. to +220° F. or from −70° F. to +300° F.), and is simple and easy to install, since it eliminates the need for a secondary field jacketing process. Furthermore, based on the selection of coating resin blend and additives for the coating layer, the product can be used in a range of demanding indoor and/or outdoor applications. For example, the product has resistance to weather conditions and to tearing and abrasion/mechanical abuse, including impact from incidental impact from lawn equipment, such as, but not limited to weed wackers. The product is also safe to handle (non-dusting and non-abrasive) and lightweight.

In some embodiments, the product has a thermal conductivity of between about 0.24 and about 0.27 BTU-inch/hr-ft$^2$-° F. at ambient temperature (e.g., about 75° F.), a water vapor permeability of about 0.2 perm or less (e.g., about 0.1 perm or less than about 0.01 perm), and 7% or less linear shrinkage. A problem that the presently disclosed subject matter seeks to solve is that the foam insulation layer can expand upon being exposed to heat. The coating layer accommodates this expansion so that the insulation product maintains its integrity despite exposure to heat. That is, ruptures of the coating layer encompassing the foam insulation layer are resisted or avoided. Installations for the product can include locations where there is heat exposure, such as an external pipe that might be exposed to sunlight or insulation covering a pipe from which heat might be radiated.

Figure 2:
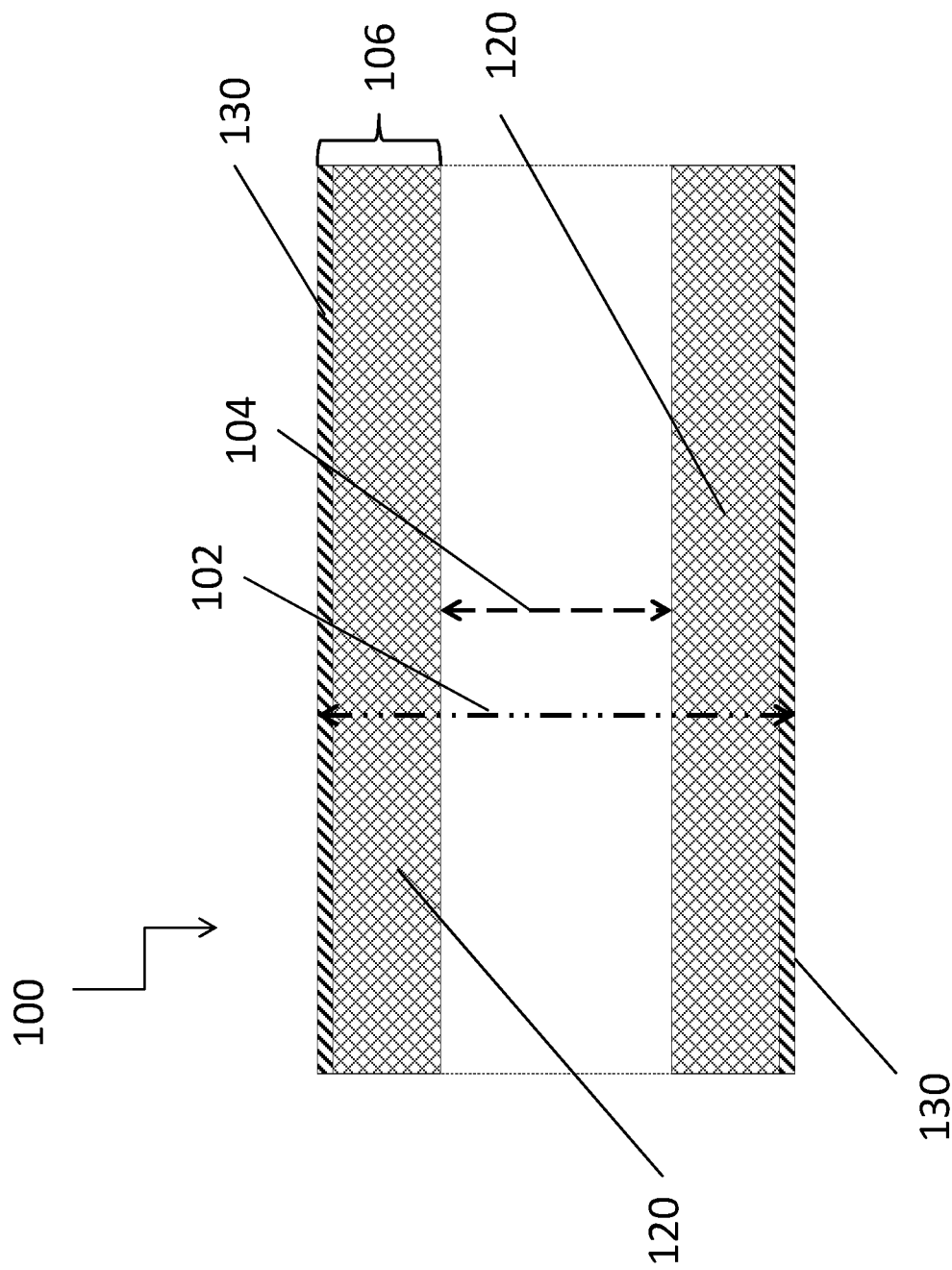
FIG. 2 is a longitudinal cross-sectional view of a composite insulation tubing in accordance with the presently disclosed subject matter.

Referring now to the Figures, wherein like reference numbers refer to like parts throughout, a composite insulation tubing in accordance with the presently disclosed subject matter is shown in FIGS. 1 and 2 as composite insulation tubing 100. Referring in particular to FIGS. 1 and 2, composite insulation tubing 100 includes a closed-cell foam insulation layer 120 (e.g., a closed-cell elastomeric foam insulation layer) seamlessly coated on its outside surface with elastomer coating layer 130. As shown in FIG. 2, composite insulation tubing 100 has wall thickness 106 (including the thickness of foam insulation layer 120 and coating layer 130), outer diameter (OD) 102, and inner diameter (ID) 104.

Figure 3:
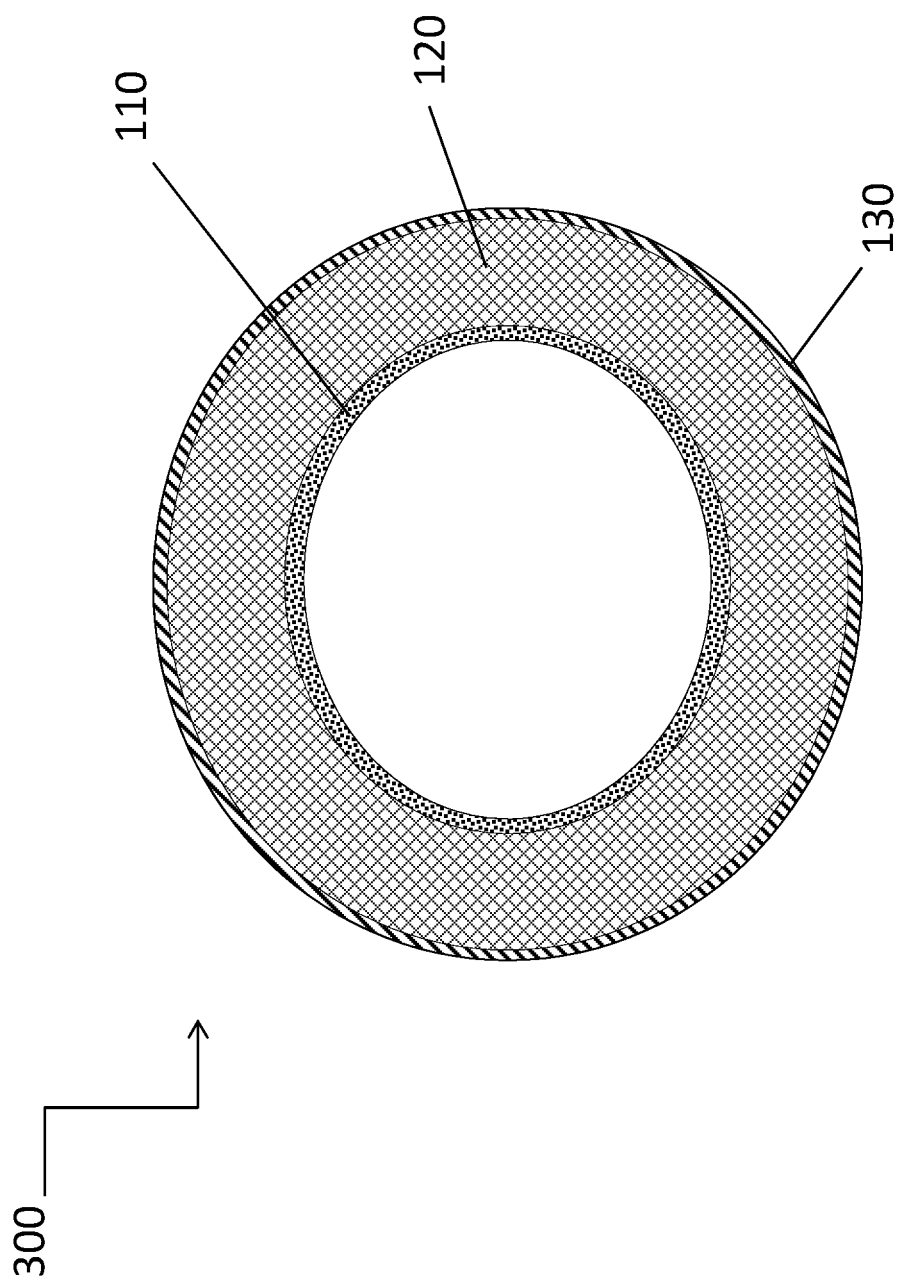
FIG. 3 is a transverse cross-sectional view of a pipe installation in accordance with the presently disclosed subject matter.
Figure 4:
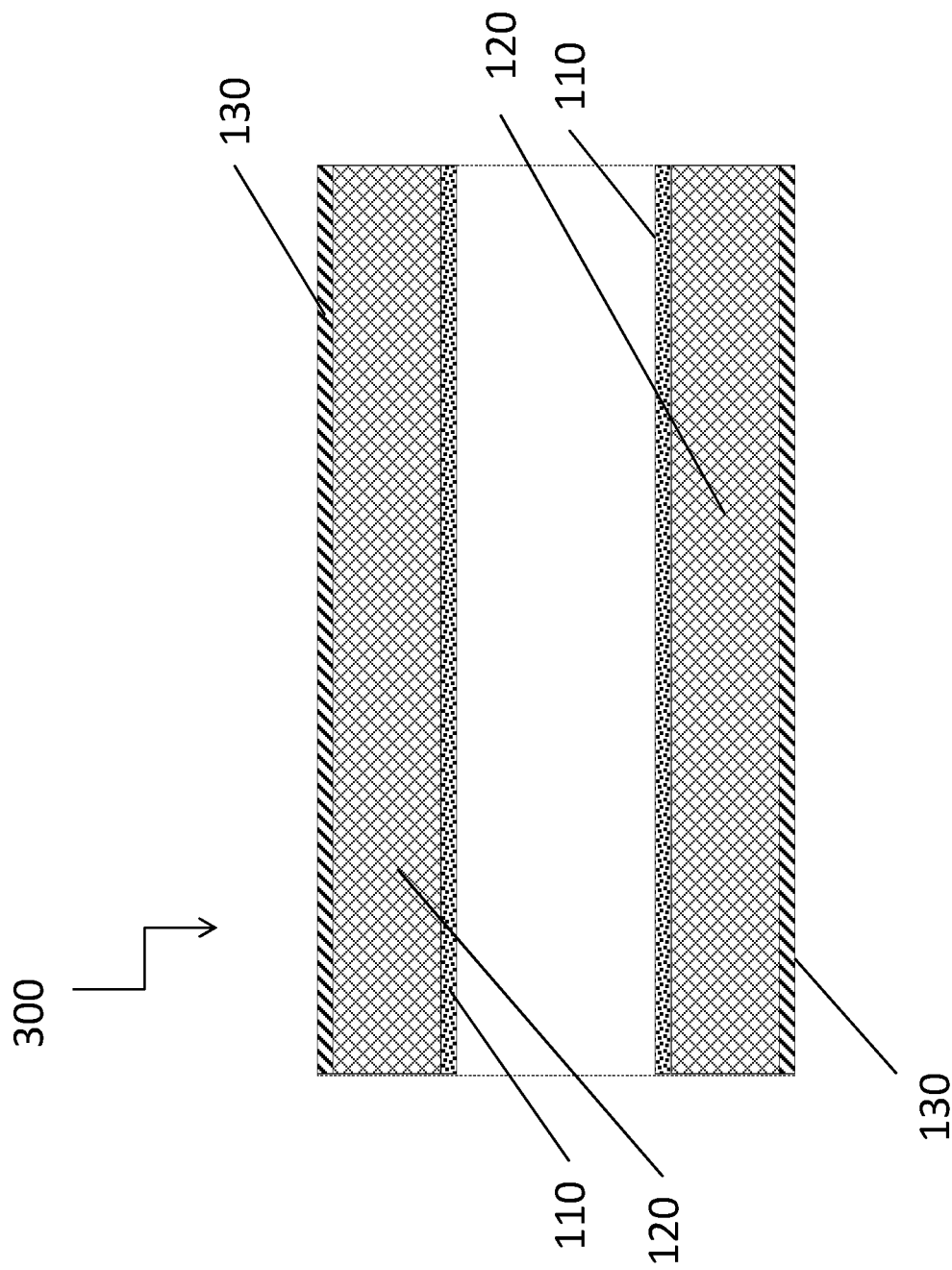
FIG. 4 is a longitudinal cross-sectional view of a pipe installation in accordance with the presently disclosed subject matter.

A pipe installation in accordance with the presently disclosed subject matter is shown in FIGS. 3 and 4 as pipe installation 300. Pipe installation 300 includes pipe 110, in this case a round pipe. Pipe 110 is covered with closed-cell foam insulation layer 120 for its entire circumference and across the length of pipe 110. Continuing with reference to FIGS. 3 and 4, elastomer coating layer 130 encompasses or encapsulates the entire circumference of closed-cell foam insulation layer 120. In some embodiments, the two layers 120 and 130 are bonded without the use of an adhesive, e.g., by forming layer 130 via extrusion from a melt comprising an elastomer resin.

Accordingly, in some embodiments, the presently disclosed subject matter provides a pipe installation (e.g., a round pipe installation) comprising: a pipe (e.g., a round pipe); a composite tubing encompassing an outer surface of the pipe, wherein said composite tubing comprises: (i) a foam insulation layer (e.g., having a closed-cell structure), optionally an elastomeric or polyethylene closed-cell foam insulation layer, and (ii) a coating layer bonded to an outer surface of the foam insulation layer. In some embodiments, the insulation product is free of an adhesive to bond the coating layer to the outer surface of the foam insulation layer. In some embodiments, the foam insulation layer comprises a material selected from the group including, but not limited to, PVC, NBR, EPDM, polyethylene, polystyrene, polyisocyanurate and combinations thereof. In some embodiments, the foam insulation layer comprises EPDM, NBR, or NBR/PVC. In some embodiments, the coating layer comprises a TPE, a TPV, and/or a TPU (e.g., a commercially available TPE, TPV and/or TPU). In some embodiments, the coating layer comprises a TPE. In some embodiments, the TPE is EPDM or is based on EPDM polymer. In some embodiments, the coating layer comprises UV-resistant EPDM. In some embodiments, the coating layer further comprises a flame retardant and/or one or more additional additives. In some embodiments, the coating layer comprises EPDM (e.g., a UV-resistant EPDM), PVC, NBR, SBR, one or more flame retardants, and one or more non-phthalate plasticizer. The coating layer can be any color. In some embodiments, the coating layer is black. In some embodiments, the coating layer is a color other than black, such as white, red, or blue.

In some embodiments, the composite or the foam insulation layer by itself has a thickness of between about %" and about 2". In some embodiments, the composite or the foam insulation layer has a thickness of between about "and about 1" (e.g., about 0.50, 0.55, 0.60, 0.65, 0.70, 0.75, 0.80, 0.85, 0.90, 0.95, or about 1.00).

The pipe can be any pipe. In some embodiments, the pipe can be round in shape (i.e., have a circular cross-section) and can be formed of any suitable material, such as, a metal, e.g., copper, steel or iron) or a synthetic polymer (e.g., polyvinylchloride (PVC)). By way of example, and not limitation, a pipe can be up to 60 inches (") in diameter, but are typically less (e.g., below about 40", or below about 20" in diameter. In some embodiments, the pipe is a round pipe with an OD of up to 4⅛" (i.e., 4.125" or less).

In some embodiments, the pipe installation is at an outdoor location. In some embodiments, the pipe installation is in a location where there is heat/sun exposure. In some embodiments, the installation is part of an air conditioning or heating unit or system. In some embodiments, the installation is part of is part of a heat pump or a solar hot water heating unit.

II. Production

In some embodiments, the presently disclosed subject matter provides a method of making an insulation product, the method comprising: providing a closed-cell foam tube (e.g., a closed-cell elastomeric or polyethylene foam tube); and extruding (e.g., using commercially available extrusion equipment) a polymeric coating in an encapsulating manner over the closed-cell foam tube to cover the outer surface of the foam tube. In some embodiments, the polymeric material is extruded in a fully-encapsulating manner over the closed-cell foam tube to fully cover the outer surface of the foam tube. In some embodiments, the extruding is performed at a temperature to ensure an adhesive-free bond between the polymeric coating and the foam surface and the polymeric coating comprises a thermoplastic elastomer. In some embodiments, the closed-cell foam tube comprises a material selected from the group comprising, but not limited to, PVC, NBR, EPDM, polyethylene, polystyrene, polyisocyanurate and combinations thereof. In some embodiments, the foam tube comprises EPDM, NBR, or NBR/PVC. In some embodiments, the polymeric coating comprises a TPE, a TPV and/or a TPU (e.g., a commercially available TPE, TPV and/or TPU). In some embodiments, the polymeric coating comprises a TPE. In some embodiments, the TPE comprises EPDM or a UV-resistant EPDM. In some embodiments, the polymeric coating further comprises a flame retardant and/or one or more additional additives. In some embodiments, the coating layer comprises EPDM (e.g., a UV-resistant EPDM), PVC, NBR, SBR, one or more flame retardants, and one or more non-phthalate plasticizer.

In some embodiments, the closed-cell foam tube is prepared via extrusion and vulcanization. In some embodiments, the foam tube has a wall thickness of between about 0.5" and about 1". In some embodiments, the method of producing the insulation product comprises an in-line process. Thus, in some embodiments, the foam tube and the coating layer can be extruded using the same production line. The coating process can also be referred to as an extrusion coating or an over jacket extrusion, wherein the foam tube being coated is already in solid form when the coating layer is extruded. Alternatively, in some embodiments, the foam and the coating layer can be co-extruded.

After the coated tubing is produced, it can be cut as desired into any suitable length prior to being installed on a pipe or prior to being packaged for sale and/or distribution.

III. Installation and Use

Figure 5:
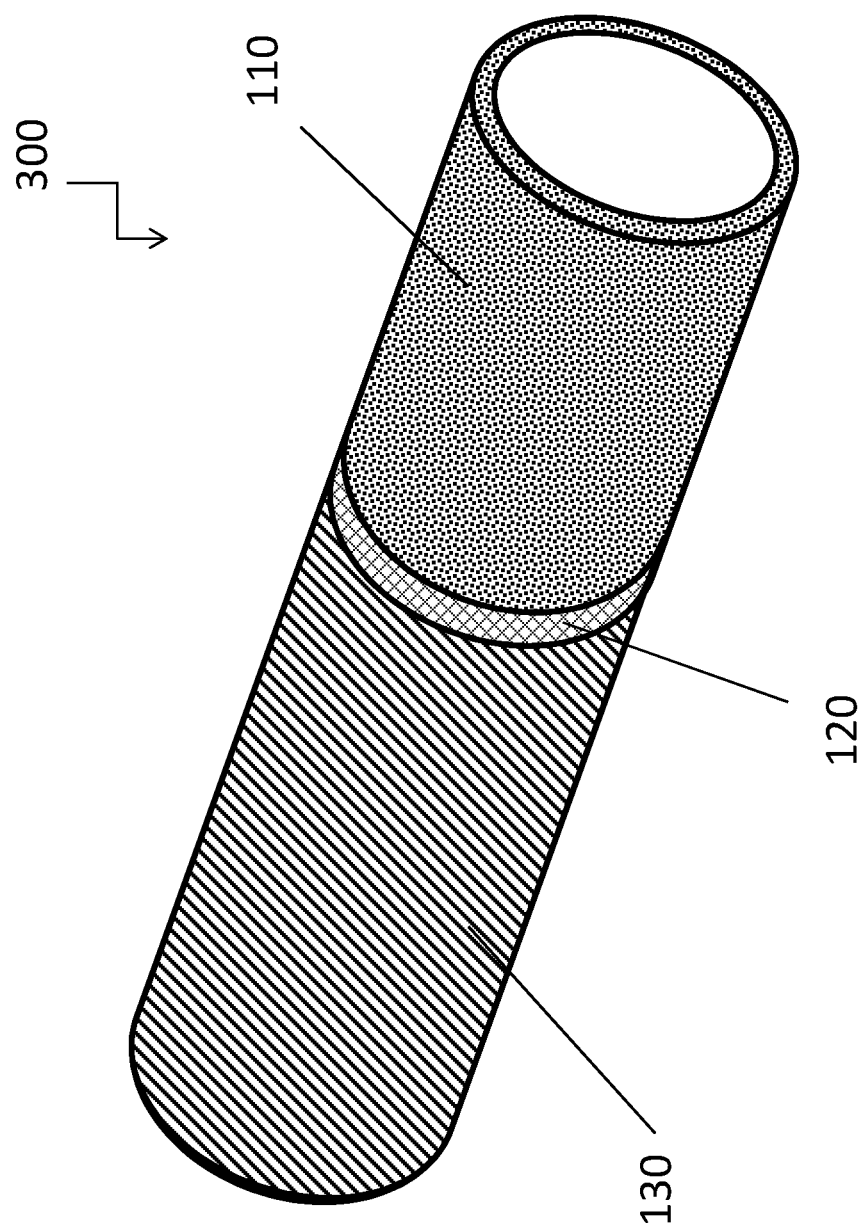
FIG. 5 is a top perspective view of a pipe installation in accordance with the presently disclosed subject matter.

FIG. 5 shows pipe installation 300 being formed. More particularly, as shown in FIG. 5, a composite tubing comprising closed-cell foam insulation layer 120 and elastomer coating layer 130 is slid over the outer surface of pipe 110. In some embodiments, the tubing is pushed over the pipe (e.g., as opposed to being pulled over the pipe). The composite tubing can be installed over a length of pipe in the field or at a factory. In some embodiments, such as when it is not possible to slide the composite insulation tubing over the pipe (e.g., for retrofitting the insulation on previously installed pipe), the composite insulation tubing can be slit longitudinally and wrapped around the piping. Any seams, butt joints (i.e., where transverse ends from two lengths of composite tubing are adjacent to one another), termination points, and/or open ends of the composite insulation tubing can be sealed, for example, with a contact adhesive. When two surfaces of composite insulation tubing are being sealed together, the contact adhesive can be applied to both surfaces to be joined.

Figure 6:
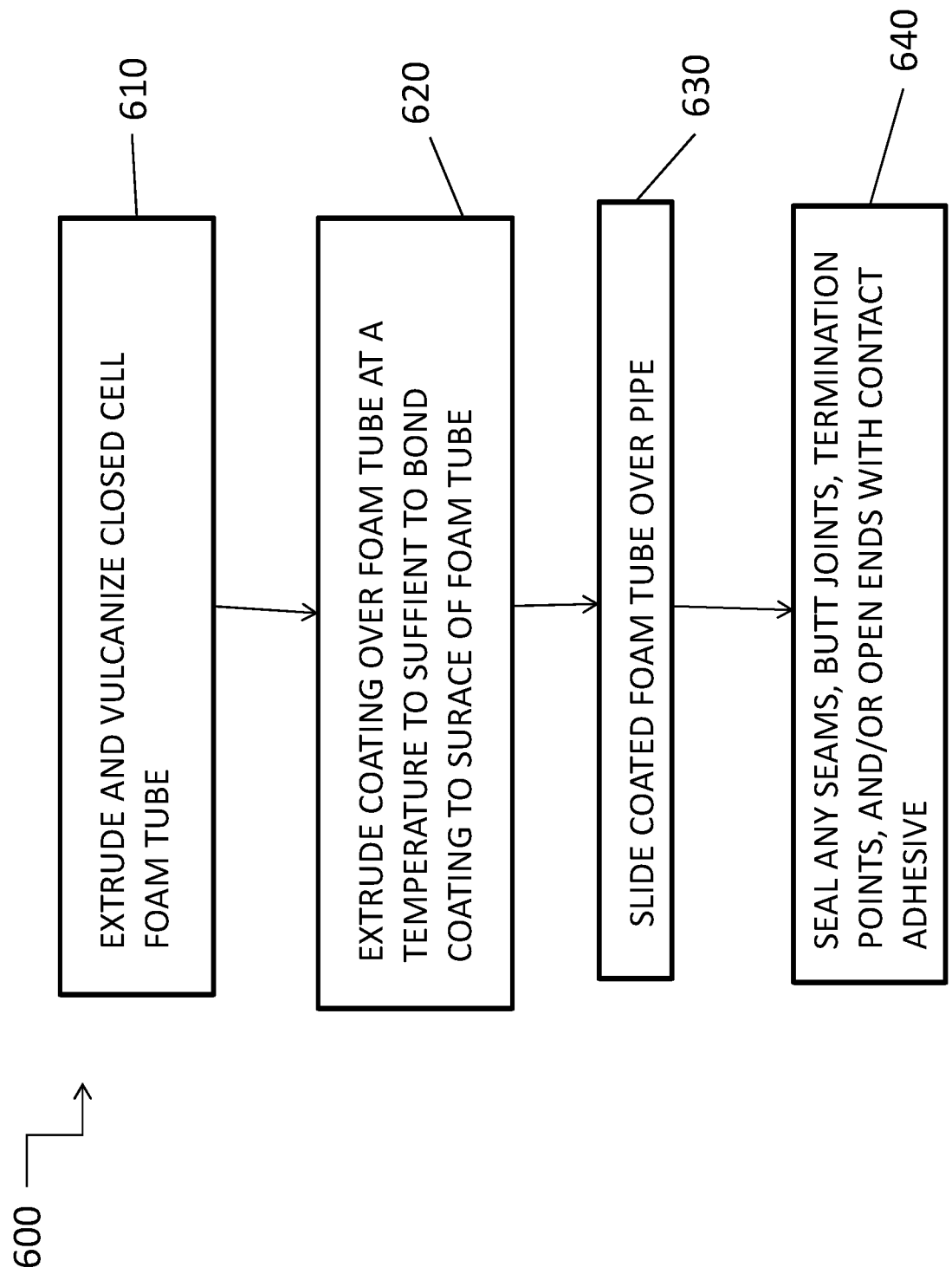
FIG. 6 is a schematic flow diagram of a production and installation/implementation method in accordance with the presently disclosed subject matter.

Thus, in some embodiments, the production and installation in the field of the presently disclosed insulation product can be accomplished according to the following non-limiting exemplary steps of method 600 shown in FIG. 6. Method 600 can comprise step 610 which comprises extruding and vulcanizing a closed-cell foam tube (e.g., comprising a tube of EPDM, NBR, or NBR/PVC having a wall thickness of between about ⅜" and about 1"). In step 620, a coating is extruded over the foam tube, the coating bonding to the foam tube due to the heat from the melted coating resin. In step 630, a length of coated foam tube is slid over a length of pipe. Then in step 640, any open ends of any butt joints or termination points, or other open ends of the coated foam tube are coated with an adhesive to protect the foam tube from moisture penetration. Butt joints can be pressed together before the adhesive cures to form a closed seal. The adhesive can be any suitable adhesive, such as but not limited to a solvent-based, hot melt or similar adhesive.

Alternatively, in some embodiments, the presently disclosed insulation product can be retro-fitted on all or a portion of pipe already in use, wherein, for example, no insulation was previously used or where prior insulation is in need of replacing. In some cases, it will not be desirable or practical to disconnect or separate the pipes such that there is an open transverse end of the pipe over which to slide the presently disclosed composite tubing. Thus, in some embodiments, it can be easier to provide the composite in the form of a sheet which can be cut to a desired length and/or width, wrapped around the outer circumference of a length of pipe, and any open longitudinal ends (i.e., ends parallel to the pipe axis) can be sealed. In some embodiments, the composite tubing is slit or cut longitudinally to form two open longitudinal ends, applied around the pipe so that the two longitudinal ends meet, and the longitudinal ends can be coated with an adhesive and contacted to one another to form a sealed seam.

Accordingly, in some embodiments, the presently disclosed subject matter provides a method of installing an insulation product on a pipe, the method comprising: providing a composite tubing comprising (i) a foam insulation layer having a closed-cell structure, and (ii) a coating layer bonded to an outer surface of the foam insulation layer; and sliding the tubing over a length of the pipe, optionally wherein the sliding comprises pushing the tubing over the length of pipe. In some embodiments, the insulation product is free of an adhesive to bond the coating layer to the outer surface of the foam layer In some embodiments, the foam insulation layer comprises a material selected from the group including, but not limited to, PVC, NBR, EPDM, polyethylene, polystyrene, polyisocyanurate and combinations thereof. In some embodiments, the foam insulation layer comprises EPDM, NBR, or NBR/PVC. In some embodiments, the coating layer comprises a TPE, TPV and/or TPU (e.g., a commercially available TPE, TPV, and/or TPU). In some embodiments, the coating layer comprises a TPE. In some embodiments, the TPE is EPDM or is based on EPDM polymer. In some embodiments, the coating layer comprises UV-resistant EPDM. In some embodiments, the coating layer further comprises a flame retardant and/or one or more additional additives. In some embodiments, the coating layer comprises EPDM (e.g., a UV-resistant EPDM), PVC, NBR, SBR, one or more flame retardants, and one or more non-phthalate plasticizer. In some embodiments, the pipe is a round metal pipe having an OD of up to about 4⅛".

In some embodiments, the method further comprises coating the transverse ends of the tubing (i.e., the ends perpendicular to the axis of the pipe) with a contact adhesive, thereby sealing the ends. In some embodiments, the method comprises coating a transverse end of the tubing with a contact adhesive and contacting the coated end with a transverse end of another length of insulation tubing encompassing an adjacent length of pipe or duct, e.g., an adhesive coated transverse end of another length of insulation tubing, to make a sealed butt seam.

In some embodiments, the presently disclosed subject matter provides a method for installing an insulation product on a pipe, the method comprising: providing a composite tubing comprising (i) a foam insulation layer having a closed-cell structure (optionally a closed-cell elastomeric or polyethylene foam layer), and (ii) a coating layer bonded to an outer surface of the foam insulation layer; slitting the tubing longitudinally to provide two slit longitudinal ends traversing the length of the tubing; applying the tubing around a section of pipe to encompass (in some embodiments, fully encompass) the outer diameter of the pipe section and so that the two slit ends are directly adjacent to one another, thereby forming an open seam; coating each of the two slit longitudinal ends of the tubing with an adhesive coating and contacting the coated slit longitudinal ends to each other to form a sealed seam; and coating the two transverse ends of the tubing with an adhesive coating to seal the transverse ends and/or to adhere one or both of the transverse ends to another length of insulation tubing, optionally another length of the composite tubing.

In some embodiments, the insulation product is free of an adhesive to bond the coating layer to the outer surface of the foam insulation layer. In some embodiments, the foam insulation layer comprises a material selected from the group including, but not limited to, PVC, NBR, EPDM, polyethylene, polystyrene, polyisocyanurate and combinations thereof. In some embodiments, the elastomer layer comprises EPDM, NBR, or NBR/PVC. In some embodiments, the coating layer comprises a TPE, TPV and/or TPU (e.g., a commercially available TPE, TPV, and/or TPU. In some embodiments, the coating layer comprises a TPE. In some embodiments, the TPE is EPDM or is based on EPDM polymer. In some embodiments, the coating layer comprises UV-resistant EPDM. In some embodiments, the coating layer further comprises a flame retardant and/or one or more additional additives. In some embodiments, the coating layer comprises EPDM (e.g., a UV-resistant EPDM), PVC, NBR, SBR, one or more flame retardants, and one or more non-phthalate plasticizer. In some embodiments, the pipe is a metal pipe having an OD of up to about 4⅛".

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method of installing an insulation product on a pipe, the method comprising:
   (a) providing a composite tubing consisting of two layers:
      (i) a foam insulation layer having a closed-cell structure, wherein the foam insulation layer comprises a combination of polyvinylchloride and acrylonitrile-butadiene rubber (PVC/NBR) and is configured to fit directly over the surface of a round pipe; and (ii) a coating layer bonded to an outer surface of the foam insulation in the absence of an adhesive and seamlessly covering said outer surface of the foam insulation layer, wherein the coating layer comprises EPDM, PVC, NBR, styrene butadiene rubber (SBR), one or more flame retardants, and one or more non-phthalate plasticizer, and wherein the composite tubing can withstand internal and external temperature cycles with temperatures ranging from −70° F. to 300° F.; and
   (b) sliding the tubing over a length of the pipe.

2. The method of claim 1, further comprising coating the transverse ends of the tubing with a contact adhesive, thereby sealing the ends.

3. The method of claim 1, wherein the sliding comprises pushing the tubing over the length of pipe.

4. The method of claim 1, wherein the pipe is a pipe of a heating, air conditioning, or refrigeration unit or system.

5. The method of claim 4, wherein the pipe is exposed to outdoor elements.

6. The method of claim 5, wherein the outdoor elements include sun exposure.

7. The method of claim 1, wherein the pipe is part of a heat pump or solar hot water heating unit.

* * * * *